United States Patent [19]

Maki et al.

[11] Patent Number: 4,938,101

[45] Date of Patent: Jul. 3, 1990

[54] CONTINUOUSLY VARIABLE SPEED TRANSMISSION

[75] Inventors: Kazuya Maki, Aichi; Yoshikazu Ishikawa, Saitama, both of Japan

[73] Assignee: Honda Giken Kogyo Kabushiki Kaisha, Tokyo, Japan

[21] Appl. No.: 251,548

[22] Filed: Sep. 30, 1988

[30] Foreign Application Priority Data

Oct. 12, 1987 [JP] Japan .................................. 62-256716

[51] Int. Cl.$^5$ ............................................ B60K 41/12
[52] U.S. Cl. ........................................ 74/866; 74/867
[58] Field of Search ............... 74/867, 877, 687, 866, 74/865, 861

[56] References Cited

U.S. PATENT DOCUMENTS

| | | | |
|---|---|---|---|
| 2,552,604 | 5/1951 | Thoma | 74/687 |
| 3,107,490 | 10/1963 | Cooper et al. | 60/443 |
| 3,665,788 | 5/1972 | Nyman | 74/687 X |
| 3,733,931 | 5/1973 | Nyman | 74/687 X |
| 4,111,074 | 9/1978 | Northup | 74/877 X |
| 4,612,828 | 9/1986 | Ide et al. | 74/867 X |
| 4,653,006 | 3/1987 | Osanai | 74/866 X |
| 4,682,519 | 7/1987 | Okoda et al. | 74/867 X |
| 4,693,081 | 9/1987 | Nakamura | 60/448 |
| 4,730,518 | 3/1988 | Miyawaki | 74/866 |
| 4,782,934 | 11/1988 | Takano | 74/866 X |

FOREIGN PATENT DOCUMENTS

| | | |
|---|---|---|
| 0093312 | 11/1983 | European Pat. Off. . |
| 0101151 | 2/1984 | European Pat. Off. . |
| 0240178 | 10/1987 | European Pat. Off. . |
| 2456473 | 8/1976 | Fed. Rep. of Germany . |
| 62-237164 | 10/1987 | Japan . |
| 1521494 | 8/1978 | United Kingdom . |

Primary Examiner—Dwight Diehl
Assistant Examiner—Chris Campbell
Attorney, Agent, or Firm—Lyon & Lyon

[57] ABSTRACT

A continuously variable speed transmission comprises a continuously variable speed change mechanism, a ratio control actuator, a controller controlling operational direction and speed of the ratio control actuator, and a speed reduction ratio detection sensor. The controller, in the case of outputting a command to reverse the operational direction of the ratio control actuator, keeps the ratio control actuators actuating at a maximum actuation speed in the reverse operation direction, until the speed reduction ratio detection sensor detects a fact that the speed reduction ratio of the mechanism has changed into the reversed direction after output of the command.

11 Claims, 3 Drawing Sheets

CONTINUOUSLY VARIABLE SPEED TRANSMISSION

BACKGROUND OF THE INVENTION

The present invention relates to a continuously variable speed transmission that can control its speed reduction ratio continuously, and more particularly to a continuously variable speed transmission that can responsively change a speed reduction ratio.

In using a continuously variable speed transmission, control of the speed reduction ratio is one of the important requirements in vehicle running performance.

Regarding the devices for controlling speed reduction ratio, as disclosed for instance in the Japanese Patent laid-open Publication No. 62(1987)-237164, there is known a control device for a continuously variable speed transmission comprising a constant displacement type hydraulic pump and a variable displacement type hydraulic motor, which device controls the speed reduction ratio by variably controlling the displacement of the hydraulic motor by way of a hydraulic actuator. In this connection, the hydraulic motor is a swash plate type axial piston motor, and the speed reduction ratio control is performed by controlling the slant angle of the motor swash plate with hydraulic servo units.

In performing a speed reduction ratio control of a continuously variable speed transmission with such an actuator as described above, the operational control of the actuator is effectuated, for example, by way of an actuation of solenoid valves controlled by a controller. The operational direction and speed of the actuator is often controlled in accordance with operational signals from the controller.

When a vehicle is running, the speed reduction ratio may sometimes be required to be decreased while it is in the operation of being increased, or vice versa. At such a time, with this control system, operational signals are output to the actuator from the controller to reverse the change direction of the speed reduction ratio. Accordingly the actuator attempts to reverse the change direction of the speed reduction ratio of the continuously variable speed transmission. However, during this operation the following difficulties may arise because of the following disadvantages of the prior-art control devices: possible play in a linkage connecting the actuator to the transmission or potential dead zones in the actuator may cause an invalid stroke of the actuator, thus resulting in time delay before the speed reduction ratio actually begins to change to the reversed direction after the command signals are inputted into the actuator, and eventually in an undesirable response in speed reduction ratio control.

SUMMARY OF THE INVENTION

It is an object and purpose of the invention to provide a continuously variable speed transmission that can perform a responsive control of the speed reduction ratio.

It is a further object and purpose of the invention to provide a continuously variable speed transmission that can minimize any time delay occurring before the change of the speed reduction ratio actually starts in a reversed direction, when operational signals are sent from a controller to an actuator to reverse the change direction of the speed reduction ratio.

To achieve the above objects, in a continuously variable speed transmission according to the invention, when a controller outputs a command to reverse an actuation direction of a ratio control actuator, the controller keeps sending such signals as to actuate at a maximum speed the ratio control actuator in the reversed direction, until it is detected from the speed reduction ratio of the transmission has been actually started to change in the reversed direction.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the scope of the present invention. Wherein.

DESCRIPTION OF THE PREFERRED EMBODIMENTS

Figure 1:
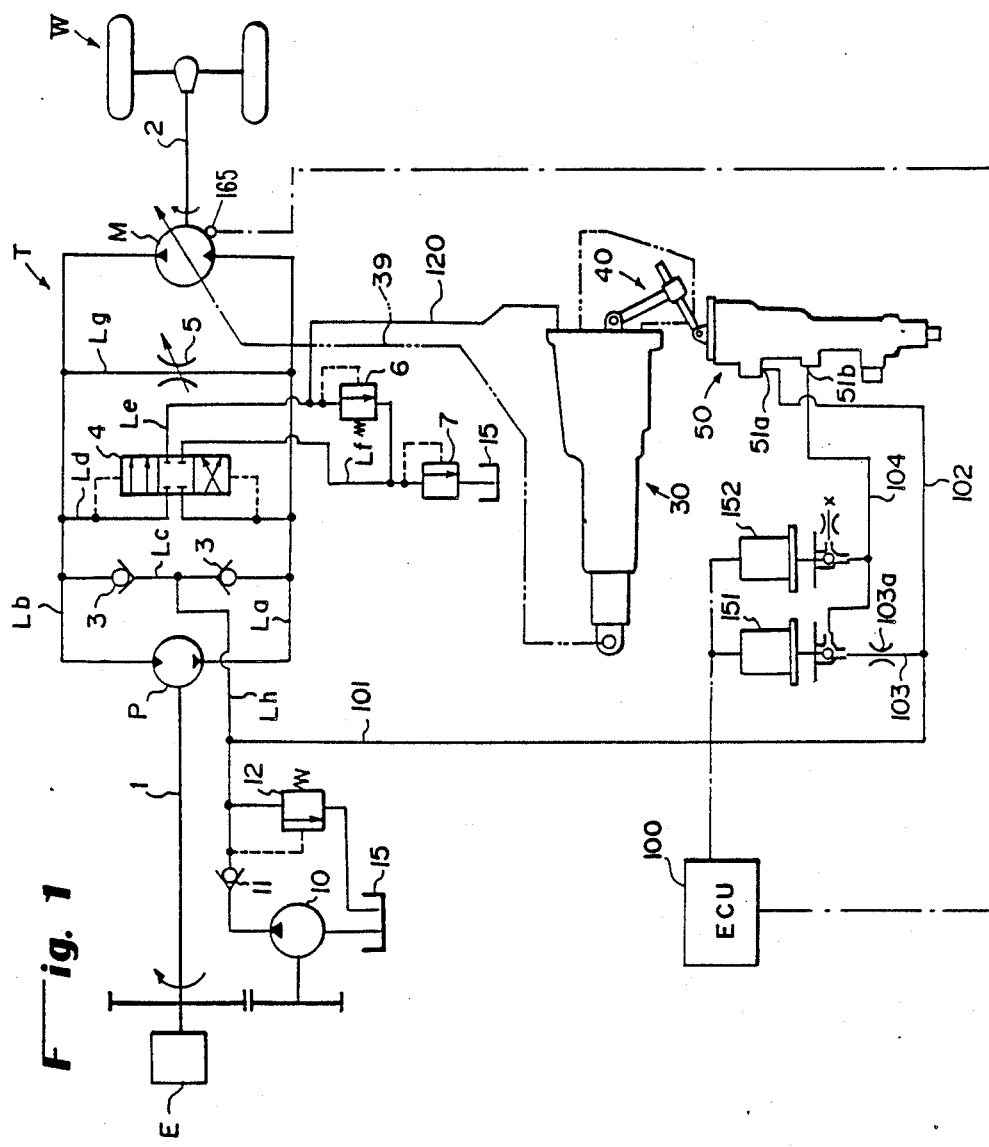
FIG. 1 is a hydraulic circuit diagram of a continuously variable speed transmission having a speed reduction ratio control device according to the invention.

FIG. 1 shows a hydraulic circuit diagram of a continuously variable speed transmission provided with a controller, according to the invention. The continuously variable speed transmission has a constant displacement hydraulic pump P driven by the engine E through the input shaft 1 and a variable displacement hydraulic motor M connected to the output shaft 2 driving the wheels W. The hydraulic pump P and the hydraulic motor M constitute a closed hydraulic circuit along with two hydraulic lines: the first hydraulic line La by which the delivery port of the pump P communicates with the suction port of the motor M, and the second hydraulic line Lb by which the suction port of the pump P does with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La or Lb which has a lower pressure, through the check valves 3, 3. A fourth hydraulic line Ld having a shuttle valve 4 is connected to the closed circuit. To the shuttle valve 4 is connected a fifth hydraulic line Le and a sixth hydraulic line Lf which respectively have a high pressure relief valve 6 and a low pressure relief valve 7 and are connected to the oil sump 15. The shuttle valve 4 is a 2-port 3-position selector valve, which is operated in response to a hydraulic pressure difference between the first and second hydraulic lines to connect either of the first or second hydraulic lines La, Lb having a higher pressure to the fifth hydraulic line Le as well as to connect the other having a lower pressure to the sixth hydraulic line Lf. Therefore, the relief pressure of a higher pressure line is regulated by the high pressure relief valve 6, and the relief hydraulic pressure of the other, lower pressure-side line is regulated by the low pressure relief valve 7.

Between the first and second hydraulic lines La and Lb is provided a seventh hydraulic line Lg to short-circuit the closed hydraulic circuit, that is, to short-cut the two lines. The seventh hydraulic line Lg is provided with a clutch valve 5, a variable opening control valve to control the opening degree of the line. Therefore, the opening control of the clutch valve 5 can effect clutch control to control the transmission of driving force from the hydraulic pump P to the hydraulic motor M.

Actuators for displacement control of the hydraulic motor M to control the speed reduction ratio of the continuously variable speed transmission T are a first and a second ratio control servo unit 30, 50 which are connected with each other by means of a link mechanism 40. The hydraulic motor M is of a swash plate axial piston type, and its displacement is changed by the control of swash plate angle by means of the ratio control servo units 30, 50.

The operation of the ratio control servo units 30, 50 is controlled by solenoid valves 151, 152 which are duty-ratio-controlled by signals from a controller 100. The controller 100 receives signals corresponding to a vehicle speed V, an engine speed Ne, a throttle opening $\theta$th, a swash plate slant angle $\theta$tr of the hydraulic motor M, an accelerator pedal opening $\theta$acc operated by the driver, and the atmospheric pressure Pat. Based on these signals, the controller 100 outputs signals for controlling the above solenoid valves so as to effectuate desirable vehicle traveling controls.

Figure 2:
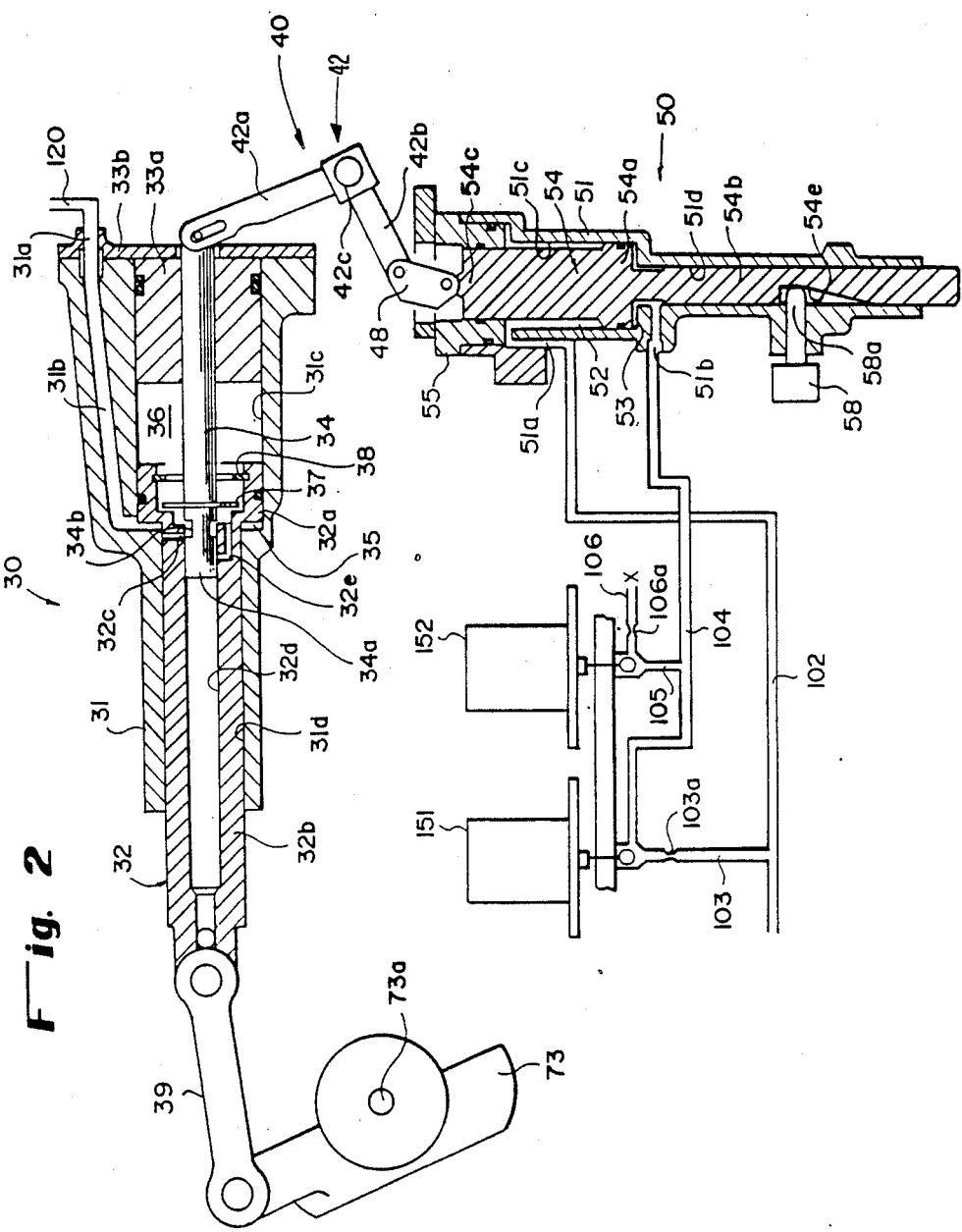
FIG. 2 shows sectional views showing a first and a second ratio control servo unit.

The structures and operations of the servo units 30, 50 are described in detail below, based on FIGS. 1 and 2.

The first ratio control servo unit 30 controls the swash plate angle of the hydraulic motor M by the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and a cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b having diagonal planes with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 35 to the oil sump (not shown) through the spool hole 32d responding to the rightward motion of the spool member 34, and a connection passage 32c which can connect the left cylinder chamber 35 to the right cylinder chamber 36 through the dents 34b responding to the leftward motion of the spool member 34, are formed in the piston member 32.

When the spool member 34 is moved rightward, the land portion 34a blocks the connection passage 32c and opens the drain passage 32e. Accordingly, the hydraulic pressure fed through the high pressure line 120 is fed into the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure is applied and therefore the piston member 32 is moved so as to follow the spool member 34.

When the spool member 34 is held still, the piston member 32 is also held still creating a hydraulic floating state because of a pressure balance between the left and right cylinder chambers 35, 36.

As discussed, when the spool member 34 is moved leftward or rightward, the piston member 32 is moved laterally so as to follow the spool member 34 by the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a, an end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a upper and a lower cylinder chamber 52, 53. The end spool portion 54b is inserted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 communicate with the upper and lower cylinder chambers 52, 53 through the ports 51a, 51b. The spool member 54 is moved up or down by the difference of hydraulic forces applied to the piston portion 54a which are determined based on the differences of hydraulic pressures and of the areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressures supplied through the hydraulic lines 102, 104 enables control of the motion of the spool member 34 and the piston member 32 in the first servo unit 30 and also enables to control the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a with the upper cylinder chamber 52 is sent through a hydraulic line 101 and 102 from the delivery line of the charge pump 10 after its pressure is regulated by the charge pressure relief valve 12. The oil pressure in the hydraulic line 104 connecting the port 51b with the lower cylinder chamber 53 is obtained by regulating the oil pressure in a hydraulic line 103 (including an orifice 103a therein), which is branched from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls drain-flow of the hydraulic oil from the line 104 in accordance with a given duty ratio.

As a result, to the upper cylinder chamber 52 a charge pressure regulated by the charge pressure relief valve 12 is applied through the line 102, while to the lower cylinder chamber 53 is supplied from the line 104 a lower pressure than the charge pressure which is regulated by the first and second solenoid valves 151 and 152. In this manner, since the pressure applied area of the upper cylinder chamber 52 is smaller than that of the lower cylinder chamber 53, the forces of oil pressures in the cylinder chambers 52 and 53 acting on the spool member 54 keep their balance when the oil pressure in the lower cylinder chamber 53 is a specified value P1 which is smaller than the oil pressure Pu in the upper cylinder chamber 52 (Pu>P1). Therefore, when the oil pressure supplied into the lower cylinder chamber 53 from the line 104 is controlled by the first and second solenoid valves 151 and 152 so as to be higher than the above pressure P1, the spool member 54 is moved upward to yield a small swash plate angle of the hydraulic motor M (i.e., to yield a small speed reduction ratio), while when the oil pressure supplied into the lower cylinder chamber 53 from the line 104 is controlled so as to be smaller than the above pressure P1, the spool member 54 is moved downward to yield a relatively large swash plate angle of the hydraulic motor M (i.e. to yield a relatively large speed reduction ratio). Further, a speed reduction ratio detecting sensor (not shown), which is a potentiometer to detect the swash plate angle, is mounted on the trunnion 73a of the swash plate 73.

The two solenoid valves 151 and 152 are controlled by signals from the controller 100: only controlling the operations of the two solenoid valves 151 and 152 based on the signals from the controller 100, the actuations of the first and second ratio control servo units 30 and 50 are controlled, which results in the control of the displacement of the hydraulic motor M, in other words, the control of speed reduction ratio.

Figure 3:
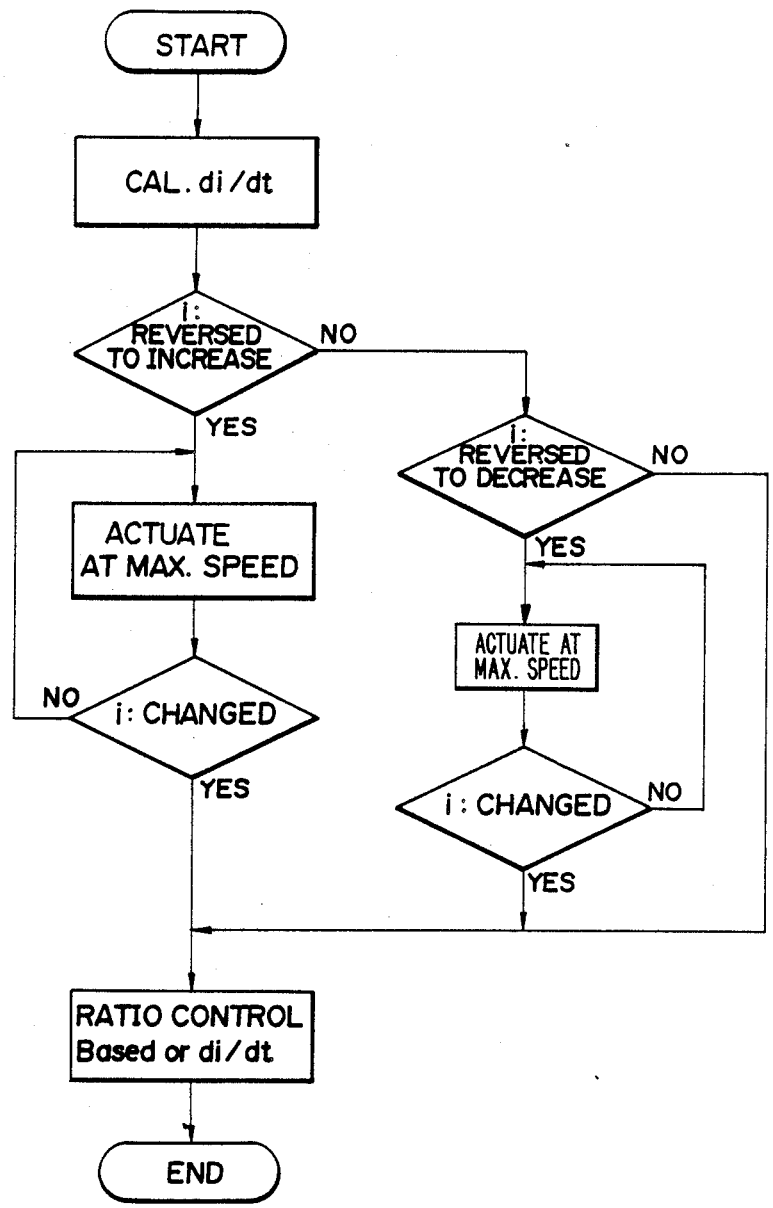
FIG. 3 is a flow chart showing an algorithm of speed reduction ratio control in the continuously variable speed transmission described above.

Referring to FIG. 3, the control of the speed reduction ratio by means of the controller 100 is now described.

In this control, a change rate of the speed reduction ratio is calculated. First, the speed reduction ratio i (=input speed/output speed) is represented by equation (1):

$$i = N/(C' * V) \tag{1}$$

where, N=engine speed, V=vehicle speed and C' is a constant. Differentiation of the equation (1) by time t gives the equation (2) for the time rate of change, or change rate, of the speed reduction di/dt:

$$di/dt = 1/(C'*V)*((dN/dt) - (N/(C'*V)*C'*dV/dt) \tag{2}$$

In the equation (2), substitutions of a reference change rate $dN_0/dt$ of engine speed for the change rate dN/dt of engine speed, a predicted acceleration $dV_0/dt$ for the acceleration dV/dt and 1/C for C' gives the equation (3):

$$di/dt = -C*(N/V^2)*dV_0/dt + C*(1/V)*dN_0/dt \tag{3}$$

As shown in the equation (3), the change rate di/dt of speed reduction ratio can be interpreted as the sum of a component $di_a/dt$ ($= -C*N/V^2*dV_o/dt$) corresponding to the predicted acceleration $dV_0/dt$ and a component $di_N/dt$ ($=C*1/V*dN_0/dt$) corresponding to the reference change rate $dN_0/dt$ of engine speed. The predicted acceleration $dV_0/dt$ is obtained from the following equations (4) to (7):

Output power Pe of the engine E (when transmission efficiency is assumed to be 100%) is given by the following equation (4);

$$Pe = Ru + Ra + Pa \tag{4}$$

where, Ru=running resistance, Ra=air resistance, Pa=reserved power of engine E.

From the equation (4), Pa is given by the following equation (5);

$$Pa = Pe - (Ru + Ra) \quad (5)$$

And, the reserved power can be given by the following equation (6), too;

$$Pa = (W + dW)*(1/g)*(dV_0/dt)*(V*10^3)/60^2*(1/75) \quad (6)$$

where, W is the total vehicle weight and dW is the total engine rotational mass.

From the equations (6) and (5), the following equation (7) is given;

$$dV_0/dt = Pa*g*60^2/\{(w+dW)*(V*10^3)\}*75 \quad (7)$$

Therefore, the predicted acceleration $dV_0/dt$ can be calculated from reserved power Pa of engine E, and the reserved power Pa can be obtained from the equation (5). On the other hand, the reference change rate $dN_0/dt$ of engine speed is determined by the following steps: calculating the difference dN between the reference engine speed $N_0$ and the actual engine speed N; and reading the reference change rate $dN_0/dt$ from a table in which the reference change rate $dN_0/dt$ is defined corresponding to the difference dN so as to obtain favorable running feeling and fuel consumption.

In this manner, the change rate of the speed reduction ratio di/dt is calculated. Then, it is judged whether the change direction of speed reduction ratio is being reversed. This judgment starts first with whether a speed reduction ratio i is reversed from a decreasing direction to an increasing direction. When it is judged that the direction is reversed in such a way as described above, the ratio control servo units 30, 50 are driven at the maximum operation speed in the reversed direction (increasing direction) so as to increase the speed reduction ratio. More particularly, the solenoid valve 151 is fully closed, and at the same time the solenoid valve 152 is fully opened. As a result, a maximum hydraulic pressure is applied to the spool member 54 downward in the drawing, to move downward the spool member 54 at the maximum speed, thus causing the swash plate 73 to be rocked at the maximum speed counterclockwise in FIG. 2.

The above motion of the swash plate 73 at the maximum speed is continued, until a speed reduction ratio detection sensor 165 (or a potentiometer) detecting the slant angle of the swash plate 73 detects that the speed reduction ratio i has actually changed to the increasing direction (the reversed direction).

On the other hand, if it is judged that the speed reduction ratio i is not being reversed from the decreasing direction to the increasing direction, then it is determined whether the ratio i has been reversed from the increasing direction to the decreasing direction. If judged that the ratio i has been reversed from the increasing direction to the decreasing direction, then the ratio control servo units 30, 50 are driven at the maximum operation speed in such a direction (decreasing direction) as to make the speed reduction ratio small. More particularly, the solenoid valve 151 is fully opened, and at the same time the solenoid valve 152 is fully closed. As a result, a maximum hydraulic pressure is applied to the spool member 54 downward in the drawing, to lift the spool member 54 at the maximum speed, thus causing the swash plate 73 to be rocked at the maximum speed clockwise in FIG. 2. The above motion of the swash plate 73 at the maximum operation speed is continued, until the speed reduction ratio detection sensor detecting the slant angle of the swash plate 73 detects that the speed reduction ratio i has actually changed to the decreasing direction (the reversed direction).

If the judgment does not agree with either cases above described, in other words if there is no reversal motion in the change direction of speed reduction ratio, or if it was detected by the speed reduction ratio detection sensor that the speed reduction ratio has actually started to change in the reversed direction, the controller 100 outputs duty-ratio signals to the solenoid valves 151, 152 to control the speed reduction ratio i based on the previously calculated change rate di/dt of the speed reduction ratio i.

In speed reduction ratio control using the ratio control device as described above, usually such a normal ratio control is performed as to control the operational direction and the speed of the actuator (servo units) based on signals outputted from the controller, but when the change direction of the speed reduction ratio is required to be reversed by way of reversing the operational direction of the actuator, the controller outputs not only signals to reverse the operational direction of the actuators but also commanding signals to set the operational speed.

Such a control as described above, when the control direction (change direction) of the speed reduction ratio is to be reversed by the actuators, may still cause a time lag due to invalid stroke generated by play in the linkage and by dead zones of the actuators themselves before the swash plate actually starts to be moved reversely after receiving the reverse operational command, but since the actuation speed is maximized during the course of operation, the time lag can be minimized.

Then, when the speed reduction ratio detection sensor detects that the speed reduction ratio has been actually changed to the reverse direction after receiving the reverse operational command, the above signal to maximize the actuation speed is canceled, and the normal ratio control as previously described is restored so that the actuators receive such operational signals as to change the speed reduction ratio in accordance with a predetermined operational speed depending on the running conditions.

The embodiments shown above exemplified the case where a continuously variable speed transmission comprising a hydraulic pump and a hydraulic motor is employed, but a control device according to the invention is obviously not limited to such a continuously variable speed transmission and may be used in other types of continuously variable speed transmissions. Furthermore, as a control device of the speed reduction ratio, not only such an electro-hydraulic device as shown in the description which controls solenoid valves by an electrical controller to actuate servo valves, but also a device to control speed reduction ratio directly by electric motors may be applicable.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A speed change control apparatus in a continuously variable transmission, comprising,
   means for changing a speed reduction ratio of said transmission, and
   means for reversing a direction of change of said speed reduction ratio from a first direction of change to a second direction of change by operating said means for changing to vary said speed reduction ratio in said second direction at a maximum speed of speed reduction ratio change until said direction of change of said speed reduction ratio has actually changed to said second direction.

2. A speed change control apparatus according to claim 1, further comprising a hydraulic pump and a hydraulic motor interconnected by a closed hydraulic circuit, at least one of said hydraulic pump and said hydraulic motor being of a variable displacement type, wherein said means for changing a speed reduction ratio varies said variable displacement in order to change said speed reduction ratio.

3. A continuously variable speed transmission, comprising,
   a continuously variable speed change mechanism capable of continuously changing a speed reduction ratio, a ratio control actuator controlling said speed reduction ratio, a controller controlling an operational direction and an operational speed of said ratio control actuator, and a speed reduction ratio detection sensor for detecting said speed reduction ratio of said mechanism,
   wherein said controller, in a case of outputting a command to reverse said operational direction of said ratio control actuator, keeps said ratio control actuator actuating at a maximum actuation speed in said reverse operation direction until said speed reduction ratio detection sensor detects that the speed reduction ratio of said mechanism has started to be actually changed into said reversed direction after the output of said command.

4. A continuously variable speed transmission as defined in claim 3, wherein said ratio control actuator comprises hydraulic servo units, an operating hydraulic pressure in the hydraulic servo units is controlled by actuable solenoid valves, and said controller controls the actuation of said solenoid valves.

5. A continuously variable-speed transmission, comprising,
   a continuously variable speed change mechanism capable of continuously changing a speed reduction ratio, a ratio control actuator controlling said speed reduction ratio, a controller controlling an operational direction and an operational speed of said ratio control actuator, and a speed reduction ratio detection sensor for detecting said speed reduction ratio of said mechanism,
   wherein said controller, in a case of outputting a command to reverse said operational direction of said ratio control actuator, keeps said ratio control actuator actuating at a maximum actuation speed in said reverse operation direction until said speed reduction ratio detection sensor detects that the speed reduction ratio of said mechanism has changed into said reversed direction after the output of said command,
   wherein said mechanism comprises a hydraulic pump connected to an engine and a hydraulic motor driven by hydraulic pressure from the hydraulic pump, at least one of said hydraulic pump and motor being of the variable displacement type, and said speed reduction ratio is controlled by said ratio control actuator which controls said variable displacement.

6. A continuously variable speed transmission according to claim 5 wherein said ratio control actuator comprises hydraulic servo units, an operating hydraulic pressure in the hydraulic servo units is controlled by actuable solenoid valves, and said controller controls the actuation of said solenoid valves.

7. A speed change control apparatus in a continuously variable transmission, said transmission having a hydraulic pump and a hydraulic motor interconnected by a closed hydraulic circuit, at least one of said hydraulic pump and said hydraulic motor being of a variable displacement type, comprising,
   means for changing a speed reduction ratio of said transmission by varying said variable displacement,
   means for detecting the speed reduction-ratio of said transmission, and
   means for reversing a direction of change of said speed reduction ratio from a first direction of change to a second direction of change by operating said means for changing to vary said speed reduction ratio in said second direction at a maximum speed of speed reduction ratio change until said means for detecting indicates that the direction of change of said speed reduction ratio has actually changed to said second direction.

8. A method of controlling a speed reduction ratio of a continuously variable transmission, comprising the steps of
   calculating a time rate of change of said speed reduction ratio,
   determining whether said time rate of change of said speed reduction ratio is being changed to reverse a direction of change said speed reduction ratio,
   if said direction of change of said speed reduction ratio is being reversed, then actuating said change of speed reduction ratio in said reverse direction so as to maximize the speed of change of said speed reduction ratio, and
   continuing to actuate said change of speed reduction ratio at said maximum speed until said direction of change is actually altered to said reverse direction.

9. A method of controlling a speed reduction ratio according to claim 8, further comprising the step of controlling said speed reduction ratio based on said calculated time rate of change of said speed reduction ratio, after said direction of change is actually altered to said reverse direction.

10. A method of controlling a speed reduction ratio of a continuously variable transmission, comprising the steps of
    calculating a time rate of change of said speed reduction ratio,
    determining whether said time rate of change of said speed reduction ratio is being changed from a direction to decrease said speed reduction ratio to a direction to increase said speed reduction ratio,
    if said time rate of change of said speed reduction ratio is being changed from said direction to decrease said speed reduction ratio to said direction to increase said speed reduction ratio, then actuating a change in said speed reduction ratio at a maximum speed of change in said increasing direction until an actual change of said speed reduction ratio in said increasing direction is detected, if said time rate of change of said speed reduction ratio is not being changed from said direction to decrease said speed reduction ratio to said direction to increase said speed reduction ratio, then determining whether said time rate of change of said speed reduction ratio is being changed from said direction to increase said speed reduction ratio to said direction to decrease said speed reduction ratio, if said time rate of change of said speed reduction ratio is being changed from said direction to increase said speed reduction ratio to said direction to decrease said speed reduction ratio, then actuating a change in said speed reduction ratio at a maximum speed of change in said decreasing direction until an actual change of said speed reduction ratio in said decreasing direction is detected.

11. A method of controlling a speed reduction ratio according to claim 10, further comprising a last step of controlling said speed reduction ratio based on said calculated time rate of change of said speed reduction ratio.

* * * * *